UNITED STATES PATENT OFFICE.

HARRY P. BASSETT, OF CYNTHIANA, KENTUCKY.

PRODUCTION OF MAGNESIA.

1,405,388.    Specification of Letters Patent.    Patented Feb. 7, 1922.

No Drawing.    Application filed January 17, 1921. Serial No. 438,052.

*To all whom it may concern:*

Be it known that I, HARRY P. BASSETT, a citizen of the United States, residing at Cynthiana, in the county of Harrison and State of Kentucky, have invented certain new and useful Improvements in the Production of Magnesia, of which the following is a specification.

This invention relates to the production of magnesia, and is particularly useful in separating the magnesium content of magnesium containing solutions or liquors such, for example, as the brines from certain lakes in Texas, notably in the vicinity of Tahoka, Texas, and mother liquors or bitterns from salt manufacture.

Some of these brines contain principally magnesium chlorid, sodium chlorid, and potassium chlorid, usually with small amounts of calcium sulfate and sodium sulfate, frequently with small proportions of other salts. Others of these brines contain magnesium chlorid, alkali metal chlorids, and substantial proportions of other alkali metal and calcium salts.

Heretofore numerous attempts have been made to recover salts of commercial value naturally occurring in these brines. The expense of recovering the potassium content of these brines is considerable, so that the margin of profit is usually so small that the separation of the potassium content is of doubtful commercial practicability.

It will be readily understood that if the magnesium content of such brines can be recovered in salable form, as well as the potassium content, the recovery of values from such brines will offer a wider margin of profit.

In the prior art, there is disclosed certain processes of treating magnesium chlorid for the recovery of magnesia, and certain processes for the primary purpose of obtaining chlorine or hydrochloric acid, wherein magnesia is recovered. In the earlier processes, such as in the Weldon-Pechiney process, where the recovery of chlorine or hydrochloric acid is of primary importance, magnesium chlorid is heated to a very high temperature to substantially eliminate the chlorine content by furnace action. The magnesia obtained when magnesium chlorid is treated according to these processes is of low grade and not salable on account of being over burned and containing small amounts of insoluble oxy-chlorid. The presence of considerable quantities of magnesium oxychlorid thus formed, which cannot be readily removed, renders the treatment of the residue for the purpose of recovering magnesia therefrom unprofitable and impracticable.

In the latter development of the art, the use of lower temperature during furnacing has been suggested but the formation of oxychlorids, has not heretofore been prevented. A further objection to the process as heretofore practiced, is that when the magnesium chlorid is heated to a relatively low temperature, such as 1000° F., a molten mass is formed which adheres to the walls of the furnace and which is therefore, unworkable on a commercial scale. The addition of a small quantity of magnesia for the purpose of forming a furnaceable composition has been suggested, but the formation of oxychlorids when the mixture of magnesium chlorid and magnesia is heated has not been prevented.

I have found that when a mixture of magnesium chlorid and magnesia wherein the magnesia is present in the proportion of from 10 to 30 parts by weight, to 100 parts by weight of the magnesium chlorid, is passed through a furnace at a temperature of substantially 900° F., in the presence of steam, the tendency toward the formation of the insoluble magnesium oxychlorid can be readily overcome and an oxid produced substantially free from chlorine, or chlorine compounds after leaching. When the proper precautions are observed in regard to the proportions of magnesia and magnesium chlorid, and in regard to temperature regulation, the formation of the insoluble magnesium oxychlorid, and other insoluble chlorine compounds can be avoided and any free or combined chlorine present in the magnesia can be removed by washing with hot water.

The magnesium oxid obtained may be treated with sodium carbonate to form basic magnesium carbonate. The magnesium oxid and sodium carbonate, in equal parts, or with the sodium carbonate in excess, are mixed in solution and boiled. The basic carbonate of magnesium so formed may be readily removed by filtering and the caustic soda solution obtained may be submitted to the flue gases from the furnacing operation containing carbon dioxid, or to carbon dioxid from any other source, to reconvert the caustic soda into sodium carbonate which may be used in treating additional magnesia.

In a typical embodiment of the invention, magnesium chlorid which may be obtained from the brines heretofore mentioned and which may contain some proportion of potassium chlorid, sodium chlorid, and other salts, or pure magnesium chlorid obtained from any desired source, is first mixed with a suitable quantity of pure magnesia in the proportion of 5 parts by weight of magnesium chlorid to 1 part by weight of magnesia. To form the mixture, the oxid may be mixed with sufficient water to form a thin paste and the magnesium chlorid dissolved in water added thereto. The solution of magnesium chlorid and magnesia is then heated until the mass solidifies and cools. After cooling, the solid material is crushed, and fed into a rotary furnace which may be heated in any manner, as by direct heat, the temperature being regulated to a temperature below 1200° F. Where potassium chlorid or other values present are also to be recovered, it is of course, necessary that the temperature be regulated to prevent volatilization and decomposition of such materials, but even where the process is being practiced with pure magnesium chlorid, it is essential that the temperature be maintained at a point that will prevent the formation of oxychlorids and other insoluble chlorine compounds when the mixture of magnesia and magnesium chlorids is heated.

The furnacing operation is allowed to continue for the desired length of time, usually about two or three hours, and a product obtained which is a very high grade magnesia in marketable form.

The time of heating may be determined by tests, as is usual in the practice of chemical processes, the material being furnaced until 80 per cent or better of the chlorine content is removed.

I have found that where a mixture of magnesium chlorid and magnesia in the proportions stated are used, the chlorine content of the original mixture will be slightly over 40 per cent. By furnacing in the manner heretofore described, the chlorine content may be reduced to from 5 to 7 per cent. The remaining chlorine may be readily removed from the magnesia formed by leaching with hot water to produce a product substantially free of chlorine.

I have found that where the furnacing operation is prolonged, the formation of magnesium oxychlorid results and the insoluble oxychlorid cannot be removed by the washing step. It is, therefore, essential that the temperature be properly controlled and that the time of heating be regulated so that the formation of oxychlorid is prevented if pure magnesia is to be obtained. Any small amount of oxychlorids formed may be removed by washing with caustic soda solution.

In place of magnesium chlorid, mixtures of magnesium chlorid and calcium chlorid may be used. The magnesia is added in the proportion of 1 part of magnesia to 5 parts, by weight, of the mixture and the mixture furnaced in the manner heretofore described. The calcium chlorid remains unaffected during furnacing and is removed by the leaching step. The process is also applicable for the separation of magnesia from magnesium lime or limestone, such as dolomite, containing both magnesium and calcium. Where such magnesium lime or limestone is employed, it is treated with magnesium chlorid in substantially equal molecular proportion to the calcium present in the material treated. The hydrochloric acid produced during the furnacing operation reacts upon the calcium present to form calcium chlorid which may be removed by washing along with any sodium chlorid or potassium chlorid originally present.

The magnesium chlorid in this step may be obtained from any independent source or may be produced by treating recarbonated dolomite lime, with the calcium chlorid to form calcium carbonate and magnesium chloride as follows:

$$MgCO_3 \cdot CaCO_3 + CaCl_2 = 2CaCO_3 + MgCl_2.$$

This magnesium chlorid thus formed is treated by any of the steps described above.

The magnesia obtained from the furnacing operation may be cheaply and economically converted into basic magnesium carbonate in a manner somewhat similar to the causticizing process of the paper industry. The magnesium oxid is added to the solution of sodium carbonate, the sodium carbonate being present in an amount equal to the magnesium oxid or in excess, and the mixture is boiled. The materials react to form basic magnesium carbonate and caustic soda, any excess of sodium carbonate remaining unaffected. The basic magnesium carbonate may be readily removed from the solution by filtering and the caustic soda solution, or mixture of caustic soda and sodium carbonate may be subjected to the action of the flue gases formed in the furnacing operation and containing a relatively large proportion of carbon dioxid, or to carbon dioxid obtained from any other source to convert the caustic soda into sodium carbonate. The sodium carbonate thus obtained may be employed in treating additional magnesia, thereby forming a cyclic process in which the sodium is constantly returned.

While I have described in detail the preferred practice of my process, it is to be understood that the details of procedure and proportions of materials may be varied, and that known chemical equivalents of the materials employed may be used, all without departing from the spirit of the invention or the scope of the subjoined claims.

I claim:

1. The process of recovering magnesia from materials containing magnesium chlorid which comprises submitting a mixture of magnesium chlorid and magnesia to heat at a temperature between 900° F., and 1200° F., in the presence of steam, and washing the resulting material to remove chlorine or chlorine compounds.

2. The process of recovering magnesia from materials containing magnesium chlorid which comprises heating a mixture of magnesium chlorid and magnesia, the magnesia being present in from 10 per cent to 30 per cent by weight of the magnesium chlorid, the temperature being maintained between 900° F. and 1200° F. the formation of oxychlorids, introducing steam into the mixture during heating, and removing chlorine present in the resulting material.

3. The process of recovering magnesia from materials containing magnesium chlorid which comprises mixing a quantity or magnesia with the material to be treated, the magnesia being present in the proportion of 1 part by weight to 5 parts by weight of the magnesium chlorid, heating to a temperature between 900° F. and 1200° F. in the presence of steam, and washing to remove any chlorine or chlorine compounds remaining after heating.

In testimony whereof I affix my signature.

HARRY P. BASSETT.